US009448700B2

(12) United States Patent
Moha et al.

(10) Patent No.: US 9,448,700 B2
(45) Date of Patent: Sep. 20, 2016

(54) SHARING SERVICES

(71) Applicant: APPLE INC., Cupertino, CA (US)

(72) Inventors: Alexandre Moha, Gentilly (FR);
Laurent Baumann, Campbell, CA
(US); Alexandre Carlhian, Paris (FR);
Philippe Champeaux, Paris (FR);
Patrick Coffman, San Francisco, CA
(US); Julien Robert, Paris (FR)

(73) Assignee: Apple Inc., Cupertino, CA (US)

( * ) Notice: Subject to any disclaimer, the term of this patent is extended or adjusted under 35 U.S.C. 154(b) by 476 days.

(21) Appl. No.: 13/629,076

(22) Filed: Sep. 27, 2012

(65) Prior Publication Data

US 2013/0205219 A1    Aug. 8, 2013

Related U.S. Application Data

(60) Provisional application No. 61/594,968, filed on Feb. 3, 2012.

(51) Int. Cl.
*G06F 3/0482* (2013.01)
*G06F 3/0484* (2013.01)
*H04L 29/08* (2006.01)
*G06F 17/30* (2006.01)

(52) U.S. Cl.
CPC ..... *G06F 3/04842* (2013.01); *G06F 17/30867* (2013.01); *H04L 67/00* (2013.01)

(58) Field of Classification Search
CPC ............... G06F 3/048; G06F 3/0486; H04L 29/08072; H04L 29/06; H04L 29/0899; H04L 12/5865; H04L 51/20; G06Q 30/0261; G06Q 30/0631; H04W 4/02; H04W 4/185; H04W 4/206; H04N 21/472; H04N 21/8153; H04N 21/8586
See application file for complete search history.

(56) References Cited

U.S. PATENT DOCUMENTS

| | | | |
|---|---|---|---|
| 8,365,081 B1 * | 1/2013 | Amacker et al. | 715/748 |
| 8,433,993 B2 * | 4/2013 | Weinberger et al. | 715/202 |
| 8,495,488 B2 * | 7/2013 | Colbran | 715/230 |
| 8,548,503 B2 * | 10/2013 | Oh | 455/456.3 |
| 2007/0270137 A1 | 11/2007 | Feng et al. | |
| 2007/0271367 A1 * | 11/2007 | Yardeni et al. | 709/223 |

(Continued)

FOREIGN PATENT DOCUMENTS

| JP | 2003-216724 | 7/2003 |
|---|---|---|
| JP | 2006-238151 | 9/2006 |

(Continued)

OTHER PUBLICATIONS

PCT International Search Report and Written Opinion of the International Searching Authority for International Application No. PCT/US2013/023884, Date of Mailing Mar. 26, 2013 (13 pages).

(Continued)

*Primary Examiner* — Jeffrey A Gaffin
*Assistant Examiner* — Mandrita Brahmachari
(74) *Attorney, Agent, or Firm* — Blakely, Sokoloff, Taylor & Zafman LLP

(57) ABSTRACT

Apparatuses and methods relating to content sharing are described. In one embodiment, a match between content type and one or more content services determine what content sharing services are displayed. In one embodiment, content sharing is accessible to all applications in an operating system.

18 Claims, 9 Drawing Sheets

(56) References Cited

U.S. PATENT DOCUMENTS

| | | | |
|---|---|---|---|
| 2008/0133737 A1* | 6/2008 | Fischer | G06F 17/30766 709/224 |
| 2009/0157632 A1* | 6/2009 | Ryu | H04W 4/02 |
| 2010/0075695 A1* | 3/2010 | Haughay et al. | 455/456.1 |
| 2010/0094822 A1* | 4/2010 | Kelapure | 707/705 |
| 2011/0029538 A1* | 2/2011 | Harple et al. | 707/741 |
| 2011/0035503 A1* | 2/2011 | Zaid et al. | 709/228 |
| 2011/0083101 A1* | 4/2011 | Sharon et al. | 715/800 |
| 2011/0107234 A1 | 5/2011 | Lee et al. | |
| 2011/0145258 A1* | 6/2011 | Kankainen | 707/746 |
| 2011/0179378 A1* | 7/2011 | Wheeler et al. | 715/780 |
| 2012/0042036 A1 | 2/2012 | Lau et al. | |
| 2012/0060100 A1* | 3/2012 | Sherwood et al. | 715/748 |
| 2012/0096357 A1* | 4/2012 | Folgner et al. | 715/726 |
| 2013/0173390 A1* | 7/2013 | Polo | G06Q 30/0261 705/14.58 |

FOREIGN PATENT DOCUMENTS

| | | |
|---|---|---|
| JP | 2011-035744 | 2/2011 |
| JP | 2011-096251 | 5/2011 |
| WO | WO 2004/062227 A2 | 7/2004 |
| WO | WO 2007/098679 A1 | 9/2007 |
| WO | WO 2011/091116 * | 1/2011 ............ G06F 15/16 |

OTHER PUBLICATIONS

Georgiy Pekhteryev et al., "Content Aware Media Server for Multimedia Home Network," Consumer Communications and Networking Conference, 2007, pp. 318-321.

Karthikeyan Balaji Dhanapal et al., "Personal Virtual Multimedia Library (PVML) in a Converged Network," Feb. 28, (8 pages), 2011 2$^{nd}$ International Conference on Wireless Communication, Vehicular Technology, Information Theory and Aerospace & Electronic Systems Technology (Wireless Vitae), IEEE.

Allegro Software Development Corporation, Networked Digital Media Standards. A UPnP/DLNA Overview, retrieved from the internet at: http://www.allegrosoft/downloads/UPnP_DLNA_White_Paper.pdf, Oct. 26 2006, (25 pages).

PCT International Preliminary Report on Patentability for PCT/US2013/023884, mailed Aug. 14, 2014.

* cited by examiner

SHARING SERVICES

CROSS-REFERENCE TO RELATED APPLICATIONS

This application claims the benefit of U.S. Provisional Application No. 61/594,968 filed Feb. 3, 2012, which is hereby incorporated by reference.

FIELD

Embodiments described herein generally relate to the sharing and distribution of data.

COPYRIGHT NOTICE/PERMISSION

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2012, Apple Inc., All Rights Reserved.

BACKGROUND

Various services are available to host or distribute content from personal computers, tablets, and mobile devices. Some examples of currently existing ways to distribute content include proprietary content sharing services such as Flickr®, Twitter®, YouTube®, iMessage®, WordPress®, Picasa®, or other content sharing services that may be used to share or distribute content. Additionally, generic communication services such as short messaging service (SMS) or email, may be used. These services often have required user registration and setup procedures to complete before using the sharing service and a user may be required to manually log in/connect to the service after an account is established.

For example, in order to share images on Flickr's® image service, a user must first create an account and sign into Flickr's® service (e.g., a Flickr® remote server) through a dedicated application, web browser or mobile device. Registering for the Flickr® content service may require a different registration process and account than Twitter's® unrelated content sharing service. Users may manage multiple accounts to share content across multiple sharing services, which requires users to manually perform a number of tedious steps, and can result in user discouragement or frustration.

To share content in one program with a number of different content sharing services may require exiting from the photo editing application (e.g., closing, minimizing or switching contexts). Then, a user must open or access each content sharing service in a proprietary sharing application or a web browser. Next, the user will have to log into each account using at least a user name and password. Finally, the user will have to locate the images on their personal computer, tablet, or mobile device. Locating the images may require performing a number of searches on the computer for the filename (if known), or manually navigating through folders in a file system (e.g., with Finder®, Microsoft Internet Explorer®, or similar file browser/manager). Some file browsers do not display thumbnail previews of images and video for the particular file type (e.g., .nef, .dng, cn2, other raw image files, or video requiring uninstalled plugins or codecs), making manual navigation of a file system to locate a particular file even more time consuming. If the targeted image or video files are eventually located on the file system, the images can be selected and copied into the proprietary sharing application or web browser. The user can switch back to the photo editing application to continue the work that was resumed.

Therefore, in order to improve efficiency and user experience, an improved way to share content is needed.

SUMMARY OF THE DESCRIPTION

In one embodiment, content aware sharing is integrated into an operating system (e.g., Mac OS® and iOS®) to allow applications and programs to automatically share content with various content sharing services. Content aware sharing, in one embodiment, allows for sharing content (e.g., data) without having to perform one or more of: switch contexts (e.g., open a different and separate content specific program or application), cut and paste, manually navigate to the content to share, or manually log in to a content sharing service.

In one embodiment, the type of selected content (e.g., text, image, movie, webpage, audio, or other content) is automatically associated with a program, application or service. Based on the determination of the type of selected content, a list or other representation of compatible content sharing options can be presented (e.g., on a display).

In one embodiment, application extensions allow for third party programs or applications to further integrate and customize the intelligent content aware sharing described above. In one embodiment, the content sharing services available to a user are modified (e.g., specified content sharing services are added, removed or hidden) when content sharing is triggered in an application.

In one embodiment, triggering content for sharing displays animation showing a representation of the content momentarily enlarged then reduced and attached or overlaid with a representation of a paper clip. In one embodiment, the selected content appears in a pop up window or box and the background behind the pop up window or box is darkened or shaded.

BRIEF DESCRIPTION OF THE DRAWINGS

The present invention is illustrated by way of example, and not by way of limitation, in the figures of the accompanying drawings.

DETAILED DESCRIPTION

Various embodiments and aspects of the inventions will be described with reference to details discussed below, and the accompanying drawings will illustrate the various embodiments. The following description and drawings are illustrative of the inventions and are not to be construed as limiting the inventions. Numerous specific details are described to provide a thorough understanding of various embodiments of the present inventions. However, in certain instances, well-known or conventional details are not described in order to provide a concise discussion of embodiments of the present inventions.

Figure 1:
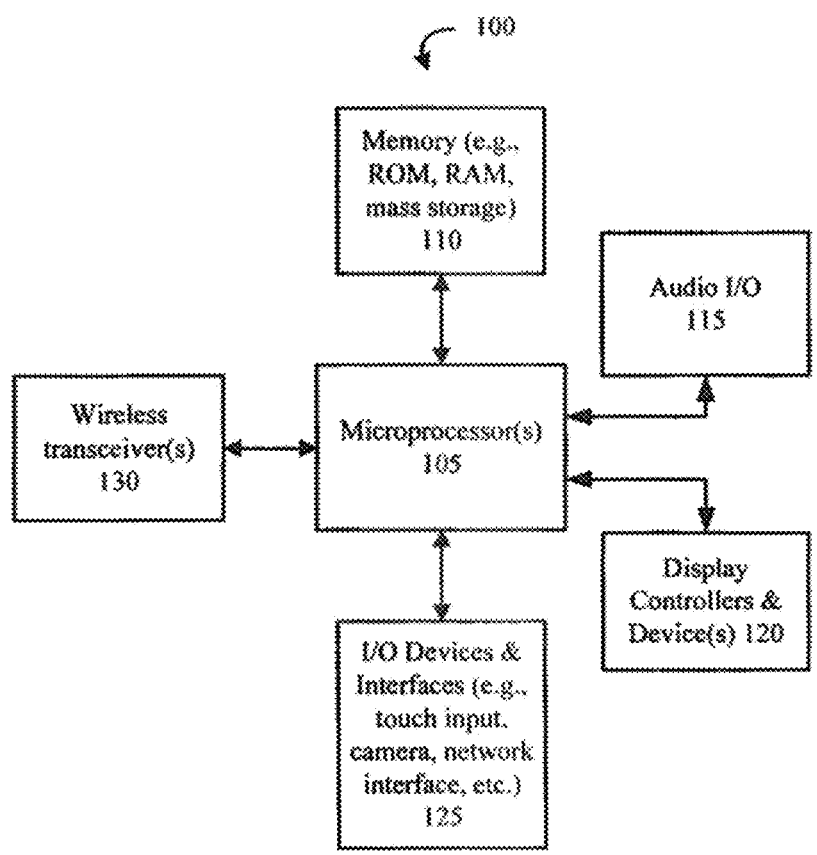
FIG. 1 illustrates, in block diagram form, an exemplary processing system to provide content aware sharing.

FIG. 1 illustrates, in block diagram form, an exemplary data processing system 100 to perform content aware sharing. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), Flash, Phase Change Memory ("PCM"), or other types of data storage.

The data processing system 100 can also include an audio input/output subsystem 115 which may include a microphone and/or a speaker for, for example, playing back music, providing telephone or voice/video chat functionality through the speaker and microphone, or other multimedia interface.

A display controller and display device 120 provide a visual user interface for the user; this user interface may include a graphical user interface which, for example, is similar to that shown on a Macintosh computer when running Mac OS® operating system software or an iPad, iPhone, or similar device when running iOS operating system software.

Data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses may be used to interconnect the various components shown in FIG. 1.

The data processing system 100 may be a personal computer, tablet-style device, such as an iPad, a personal digital assistant (PDA), a cellular telephone with PDA-like functionality, such as an iPhone®, a Wi-Fi based telephone, a handheld computer which includes a cellular telephone, a media player, such as an iPod®, an entertainment system, such as a iPod Touch®, or devices which combine aspects or functions of these devices, such as a media player combined with a PDA and a cellular telephone in one device. In other embodiments, the data processing system 100 may be a network computer or an embedded processing device within another device or consumer electronic product.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may include a connector for a dock or a connector for a USB interface, FireWire, Ethernet, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

In one embodiment, an operating system (e.g., Mac OS® or iOS®) is integrated with a content aware sharing module, plug in, or engine and all applications are able to access content aware sharing. In one embodiment, content aware sharing is integrated into individual applications instead of at the operating system level.

Content

For the purposes of this application content includes data that can be manipulated by a user or data processing system. Manipulation is defined as one or more of editing, selecting, opening, viewing, copying, moving, cutting, pasting, and other techniques for interacting with data. A user can manipulate data by using a touchscreen, mouse, trackpad, trackball, keyboard, voice commands, or other similar techniques. Content includes files on a data processing system, however content is not limited to files. For example, content also includes objects and data selected within a program or application and selections (e.g., a selection of text or graphics in a web browser, word processor, or text editor).

In one embodiment, one or more separate types of content are selected for sharing. For example, a content selection of text also includes images, audio, and video content. Many other combinations of content are possible and compatible for use with content aware sharing. Selection of multiple types of content is described in greater detail below.

Content type can also be associated with content sharing services or transfer modes (e.g., MOV, .AVI, .WMV, .FLV and MPEG4 content types can be associated with YouTube®) as described in greater detail below.

Content Association

In one embodiment, content can be associated or assigned to specific content types. A database or data store can associate content type identifiers with individual transfer modes or content sharing services. Content types provide information about the content of data.

In one embodiment, multiple content types can be assigned or associated with the same content. For example, a football.mov file can be associated with both the Apple QuickTime® content type as well as the movie content type. In other embodiments, content has one related or associated content type (e.g., .mov is a QuickTime® content type) and a broad category type (e.g., .mov is part of the movie category type).

In one embodiment, content type determines which application or content sharing service is associated with viewing or manipulating the content. In some embodiments, an operating system maintains content relationship associations that can be referenced by the content aware sharing module (e.g., MacOS® associates .html files with Safari® and .jpg files with iPhoto®). For example, football.mov can be associated with YouTube® and the QuickTime® movie application based on the data QuickTime® content type. In another example, QuickTime® may be associated with the a movie content type category, but not specifically associated with every sub-category of content type (e.g., QuickTime® may not support Divx® even though Divx® is a movie file). Therefore, QuickTime® content types can be narrowly defined as including .mov, MPEG-4, MPEG-2, MPEG-1, 3GPP, AVI, DV and content with specific codecs or components (e.g., Apple ProRes, Apple Pixlet®, Cinepak®, Motion JPEG®, H.264, etc). For example, .avi files may have multiple components or codecs that may not be compatible with a particular application or content sharing service. In one embodiment, a high level of granularity is supported for determining compatible or matching content types and determining codec or components of individual files or data selections. For example, the content aware sharing module can determine not only that an object or file is an image, but also the specific type of image (e.g., JPEG, GIF, TIFF, etc). In another example, the content aware sharing module can determine that YouTube® can receive .avi with MPEG-2 codec but not Divx®. In another example, the content aware sharing module can determine that Flickr® can receive JPEG, non-animated GIF, and PNG but not RAW or TIFF.

Various techniques can be used to determine the selected content type and associated context (e.g., application or content sharing service). In one embodiment, a data processing system, application, context or program, references special data identifiers (e.g., Uniform Type Identifier standard maintained by Apple®) that can represent content types. For example, the Uniform Type Identifier public.image represent the image category and includes public.jpeg, public.tiff, and other image content types. Public.movie can represent the movie category and includes public.mpeg, com.apple.quicktime.movie, and other movie content types. Public.text can represent the text category and include public.html, public.plain.text, and other text content types. File extensions can also serve to group specific content types. For example, a database or data store can associate or link files with a .jpg, .gif, .png, .bmp extension, with an image content type, or more specifically .jpeg with the JPEG content type, .gif with the GIF content type etc. In yet other embodiments, file headers can provide information to determine content type of a file (e.g., reading the header of a file will specify a particular content type). The content sharing module described herein can use one or more of the above specified methods to determine a content type.

Content type can also be associated with objects other than files, such as a user selection within a context or a selection within a GUI of an application (e.g., text highlighting, image or video selection, audio selection and other). For example, within Safari® a user can select a block of HTML that includes references to images and text.

In one embodiment, when a content type is an object instead of a file, the object can be passed to the content aware sharing module (e.g., via an API) for determination of content type. Multiple different content types can be determined within one object or selection in a GUI of an application.

Content Aware Sharing

Content aware sharing allows for sharing without having perform one or more of: switching contexts (e.g., open a separate content specific program), cutting and pasting, or manually navigating to the content to share on a content sharing service. Content aware sharing enables fast, automated sharing of content across content sharing services without requiring a user to switch applications or type a username and password. For example, while an image is selected in an image preview program (e.g., iPhoto®), a user can trigger content aware sharing to automatically upload the selected image to an online sharing service, such as Flickr®, Picasa®, or cloud based storage service. Within the same image preview program, a user can also trigger content aware sharing to send the image directly to another computer or send the image to a Twitter® feed. In another example, a user can trigger content aware sharing and share (e.g., email, text, iMessage®, Twitter®, or send with another service) the content of a webpage or a section/portion of webpage without having to cut and paste or exit the web browser to change context to another program. For example, within the GUI of Safari®, a user can highlight (e.g., select) a news article that includes images and text and trigger content aware sharing. The content aware sharing module can receive the selected text and images and determine compatible content sharing services (e.g., email, Tumblr®, or Blogger™).

In one embodiment, content aware sharing can be a module installed or integrated into an operating system (e.g., MacOS®, iOS®, etc.). In some embodiments, the content aware sharing module can be accessed by applications on the operating system through an application programming interface (API) as described in greater detail below.

Sharing as used herein also includes storing content for personal use, even if only the original content producer or user accesses the content. A content sharing service can be a mode of transporting or sharing content from an originating data processing system or user (e.g., email, text messaging, image hosting, cloud storage, social networking, folder, directory, and others) to a destination data processing system or user account.

Destination, as used herein, describes an identifier or set of identifying characteristics associated with a particular content sharing service (e.g., user account/user identification associated with an hosting service, email address, directory, descriptive tag, phone number for text message or other identifiers). A destination can be the particular user account or alternatively a general sharing service (e.g., email, text message or similar). For example, sharing content to Flickr® can require a registered Flickr® account in order for Flickr® to accept the shared content. As used herein, the Flickr® service is considered to be a content sharing service (or transfer mode) used to reach a destination (the particular Flickr® user account).

In one embodiment, the type of selected content (e.g., text, image, movie, audio, webpage or other content) is automatically associated with a program, application or service.

In other embodiments, the content aware sharing module receives a selection of content (e.g., via an API) and processes the content to determine one or more content types of the content. For example, a user may select a portion of a web page containing text, video and graphics types. Upon receiving notification of the selected portion of the web page, the content aware sharing module may receive the entire portion of text, video, and graphics to analyze for content types. In other embodiments, the operating system makes a determination of the content types that were selected. The operating system can send the content aware sharing module the content type classification (e.g., JPEG type and Plain text type descriptors are sent) instead of the actual body of text, image or video. For example, upon selecting a section of a web page, the operating system may be able to determine text, image, and video types were selected and pass along to the content aware sharing module, notification that text, image, and video types are selected by the user rather than having to transmit the actual text, images and videos selected. Upon receiving either the selected data or a representation or interpretation of the data (e.g., the content type categories/descriptors), the content aware sharing module can make a determination of compatible content sharing services (subject to any exclusion list).

Based on the determination of the type of selected content, a user can be presented with a list of transfer options in the GUI of an application. For example, image files (e.g., png, jpg, and gif) are determined by the content sharing module to be associated with content sharing services that allow PNG, JPEG, and GIF image uploading (e.g., Flickr®, Picasa®, and others). In one embodiment, the user is presented with the list of transfer options without having to exit the application where the user selected the content. For example, the user selects text and images within Safari®, and without the user exiting or switching to a browser, content sharing options are displayed with Safari® or overlaid on top of the Safari® window. After the content sharing options are selected, the user automatically returns to the Safari® window they were previously working in (where the content was selected).

In one embodiment, a user provides account and registration information (e.g., user name, password, email address, or other) in a setup or configuration program executed on an operating system. After a user completes a one-time registration program the content aware sharing module can reference the completed registration information to automate content sharing. For example, the user may store their Flickr® username and password as part of a one-time user setup for content aware sharing. The username and password can be stored in a file on the operating system for future use by content aware sharing. The account and registration information can be accessible by the content aware sharing module and passed onto applications running on the operating system via an application programming interface. In other embodiments, applications running on the operating system do not have access to the account password and registration information, and instead the content aware sharing module connects directly to a content sharing service and passes the account information along with the content to be shared.

Accessing previously stored registration information allows the content aware sharing module to bypass the manual process of a user having to type in their user login ID and password every time they want to send content. User account and registration information can be stored in an encrypted database or a data store accessed by the content aware sharing module. In other embodiments, the content aware sharing module or associated applications passes encrypted data through to a content sharing service without unencrypting and having access to the unencrypted user account, password, and other registration information.

A database, list or other data store can index or assign a plurality of content sharing services for use with content aware sharing. Each content sharing service can be associated with specific content types. In one embodiment, image files (e.g., png, jpg, gif, tiff, and bmp) are automatically associated with services that allow image uploading (e.g., Flickr®, Picasa®, SMS, Twitter®, and others). For example, Flickr® can be associated with the image content type as well as many different types of images (e.g., png, jpg, gif, tiff, raw, and dng). Content sharing services can be associated with different classes of content types. For example, blog or social networking content sharing services can allow for sharing text, images, movies, and audio files.

In one embodiment, an operating system (e.g., Mac OS® or iOS®) provides content aware sharing capabilities to all applications that interface with supported content (e.g., recognizable or authorized content types). In one embodiment, applications can embed a share button or other method for a user to trigger content aware sharing.

In one embodiment, selecting content within an application and selecting/triggering a share button automatically builds and displays a list of relevant sharing options that can be displayed in a GUI of an application. In other embodiments, selecting/triggering the share button calls the content sharing module (e.g., through an API) and passes the selected content to the content sharing module for analysis and determination of the content types within the selected content. The results of the content type determination are then sent from the content sharing module to the calling application (e.g., via an API). After determining the various types of content represented, the content sharing module can further determine which content sharing services are compatible with the determined types of content. Then, within the GUI of the application, a list or other representation of compatible content sharing services is provided to the user, who can select one or more of the content sharing services for the selected content.

In one embodiment, when the list of relevant content sharing options is determined, the list is displayed in a way that the user can select one or more content sharing options (e.g., within the GUI of an application or a window overlay on top of the application window). In one embodiment, selecting a sharing option opens a dialog box that can receive input and the input is associated with or identifies a destination for the content to be shared. In one embodiment, the content aware sharing menu is automatically populated with content sharing services that are able (e.g., initialized or pre-setup) to share the content.

Content sharing services setup for access by content aware sharing are considered "available" content sharing services and are readily accessible to a user from within a program or application. Content sharing services can also be selectively removed or restricted to certain applications or programs. Content services missing account information or suffering a loss of service connection (e.g., content sharing service server unreachable) are determined to be "unavailable." Unavailable content sharing services can be ignored and not displayed as a user selectable option for sharing. Alternatively, unavailable content is distinguished from available content by shading, greying out, or otherwise differentiating potential selections from available content sharing services. Selecting an unavailable content sharing service can prompt the user to enter account or setup information to switch the status of the content sharing service available. In some embodiments, selecting a content sharing service that has not been pre-setup with a username and password combination, prompts the user to enter the username and password and asks whether the username and password should be saved for future reference.

In one embodiment, content is transferred over network interface such as interface 125 described above (such as, for example, Ethernet, WiFi, Cellular Telephone Network, etc.). In one embodiment, multiple destinations can be selected to simultaneously share one or more types of content with multiple content sharing services. In one embodiment, content services include services that store or otherwise provide access to content on a data processing system. For example, content sharing services can store content on remote servers for access by the original user or other users (e.g., social networking, image hosting services and others). Depending on the type of content sharing service, multiple users can have access to shared content. For example, a user can share an image from a personal computer with a wide audience by publishing the image to an image hosting website (content sharing service).

Content sharing also includes transactions with only one content sender and one content receiver such as certain implementations of sharing content by email and messaging (e.g., SMS®, text, iMessage® or similar services). For example, the process of sending an email includes "sharing" the email with a server or data processing system that routes or directs the email to one or more destinations. Content sharing does not require two or more copies of the content to exist in (or be owned by) a plurality of distinct locations at the same time. For example, content sharing includes sending content from a source to a target and simultaneously or subsequently deleting the original content on the source. Other methods for sharing content not explicitly described here are included in the definition of content sharing.

Figure 2:
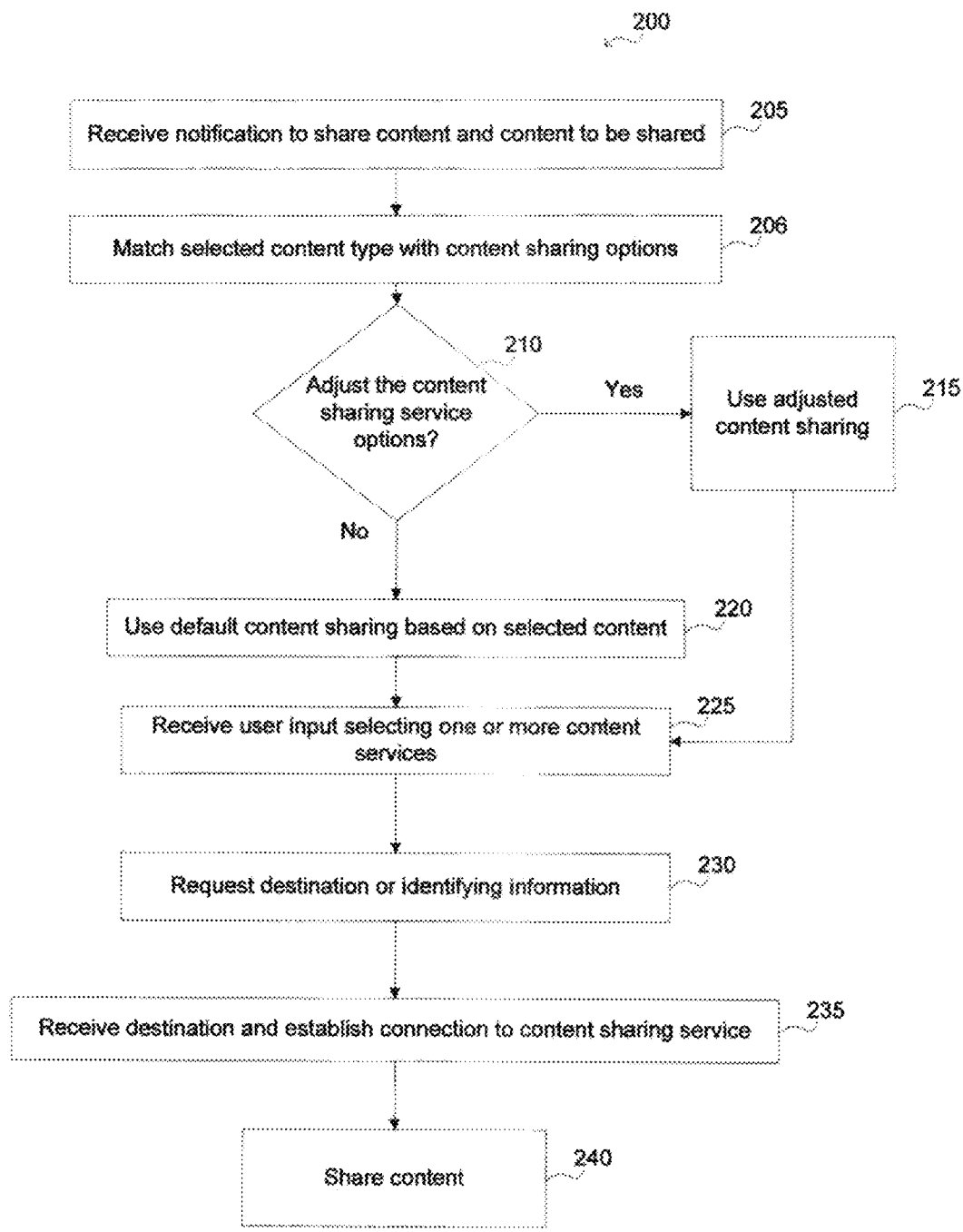
FIG. 2 is a flow chart illustrating a method for content aware sharing, according to one embodiment.

FIG. 2 is a flow chart illustrating a method 200 for content aware sharing, according to one embodiment. At Block 205 the method receives content selected within a GUI or other interface of an application. For example, the selection can be an input indicating a request to share selected content. In one embodiment, the request to share content is initiated by clicking or touching a share button (or other representation). In other embodiments, a menu item, voice command, hotkey, differently named button, or other user interface initiates the request to share the selected content.

At Block 205, the content type for the content is determined. In one embodiment, the request to share selected content passes the content selection to a content aware sharing module, plug in, or engine. For example, when text and image content is selected and the share button is triggered, the selected content is transferred to the content aware sharing module for analysis of content type.

At Block 206, the type of the selected content is matched with available content sharing services. In one embodiment, a list of content sharing services that match the content type is created and this list can be displayed in one embodiment. For example, selecting an image file causes a system to find image content sharing services.

At Block 210, the method 200 optionally determines whether to edit or override the content sharing services in the list. In one embodiment, method 200 can override the default matches between a content type and a content service. For example, a system administrator can exclude certain unsafe or unauthorized content sharing services. In one embodiment, an exclusion list eliminates certain content sharing services from consideration. In one embodiment, the list of matching content sharing services is adjusted based on region. For example, a user on a system with the region designated as China matches content to Chinese language content sharing services. Further details of region adjustment and application level adjustments are described below.

If method 200 determines no adjustment of the content sharing options is needed, the method proceeds to Block 220. Otherwise at Block 215, the content sharing options are adjusted based on region, application preferences, or system preferences and method 200 proceeds to Block 225.

At Block 220, the default content sharing options are used and method 200 makes no content sharing display adjustments.

At Block 225, user input selecting one or more transfer modes (content sharing services) is received. In one embodiment, selecting two or more transfer modes opens two or more destination entry windows.

In one embodiment, a request for destination or identifying information is sent, as shown at block 230. At Block 235, the method 200 receives identifying information or destination information. In one embodiment, GUI displays a dialog box, or window with a request for destination or identifying information. The destination can be an email address, user account or telephone number. The description can be keywords, comments, subject line, or other content associated with the content sharing service. In some embodiments, a description and destination are optional. For example, sharing with the Flickr® service automatically sends to a specified user account (e.g., the main user of the device) and optionally requests a description for the image file to be shared. The specific data items requested for routing the content depends on the particular content sharing service. For example, email may request an email address, or iMessage® may request a phone number or user account to send a message.

At Block 240, the content is sent/shared with the selected content sharing service(s) to a destination.

Application Level Customization

Content types are associated with compatible content sharing services. In one embodiment, content within an application is automatically associated with one or more content types. In one embodiment, selected content is associated with all available and compatible content sharing services. For example, .jpg files can be associated and shared with Twitter®, Flickr®, Email, AirDrop®, and iMessage®. In one embodiment, the associations between content type and content service are predetermined by the operating system. In one embodiment, the associations and between content type and content service are adjusted globally for all applications by modifying a system configuration file. In one embodiment, each individual application can be configured for unique associations with content types and content services. For example, application A can be configured to associate text content types with service X while application B can be configured to associate text content types with service Y.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Applications are software designed to run in an operating system such as Mac OS or iOS. Applications can help a user perform specific tasks or manipulate content. Application extensions or APIs enable third party applications (e.g., applications not included or pre-installed in an operating system, or not supported by the operating system natively) to customize content aware sharing as described herein. In one embodiment, application extensions or API enable customization of the list of content sharing services displayed in the GUI of an application.

In one embodiment, applications can use default content associations to generate or provide a list of content sharing services available within the application. For example, Mac OS® can automatically associate image content types with Flickr® and Twitter® sharing services. For example, applications on Mac OS® that interface with JPEG image content can use an embedded content aware sharing mechanism (e.g., share button) to share images on the Flickr® or Twitter® content services.

In one embodiment, an application can override or customize the presentation or display of content type associations. For example, an application can replace, block, or change which individual content type is associated with a content sharing service. For example, text content type is associated with content services X, Y, and Z. In this example, application A can override the default association of text content type to content services X, Y, and Z so that content service X is not displayed as a content sharing service option. Application A can change the associations of content selected inside application A. Therefore, while in application A even though content service X would by default be provided as an option when text is selected, application A causes the content aware sharing to hide or distinguish (e.g., shade, grey out, colored red, etc.) content service X. Alternatively, application A can add content service W even though W is not by default, associated with the text content type selected in application A.

In one embodiment, changing the content sharing options on an individual application basis is accomplished through application extensions or the content sharing API. For example, an application can provide the content sharing module with the selected content, and request that a new or customized content type associate be considered before returning the content sharing options. In another example, the content sharing module can return a default content sharing list and the application can edit the list before displaying the content sharing options within the GUI of the application.

In one embodiment, applications can associate content sharing services for use only by a specific application. For example, Safari® (a web browser) can associate text and image content types with a content sharing service that is only accessible from within Safari®.

Adjusting to Region Specific Content Services

In one embodiment, the list of content sharing services is adjusted based on a region associated with the data processing system or operating system. In one embodiment, region is determined from one or more of a configuration file containing region information, Global Positioning System data, or Internet Protocol address associated with the data processing system. Some operating systems (e.g., Mac OS® and iOS®) maintain a geographic region setting. Geographic region can be based on user preferences set in the operating system.

In one embodiment, content sharing services are selected for association with content based on the geographic region associated with the data processing system or operating system. For example, if the geographic region associated with the data processing system or operating system is China, content sharing services based in China can be preferentially assigned over other regions. For example, Twitter® or Flickr® can have a version of their content sharing service depending on geographic region (United States, China, Japan, France, etc.). In one embodiment, the content aware sharing module determines the user's region and provides region specific content sharing services (e.g., a Chinese version or equivalent to of the service provided by Twitter® is provided to Chinese users) while content sharing services from other geographic regions are hidden or distinguished (e.g., U.S. Twitter® is hidden, greyed out or de-emphasized for users in China).

Graphical User Interface

Figure 3:
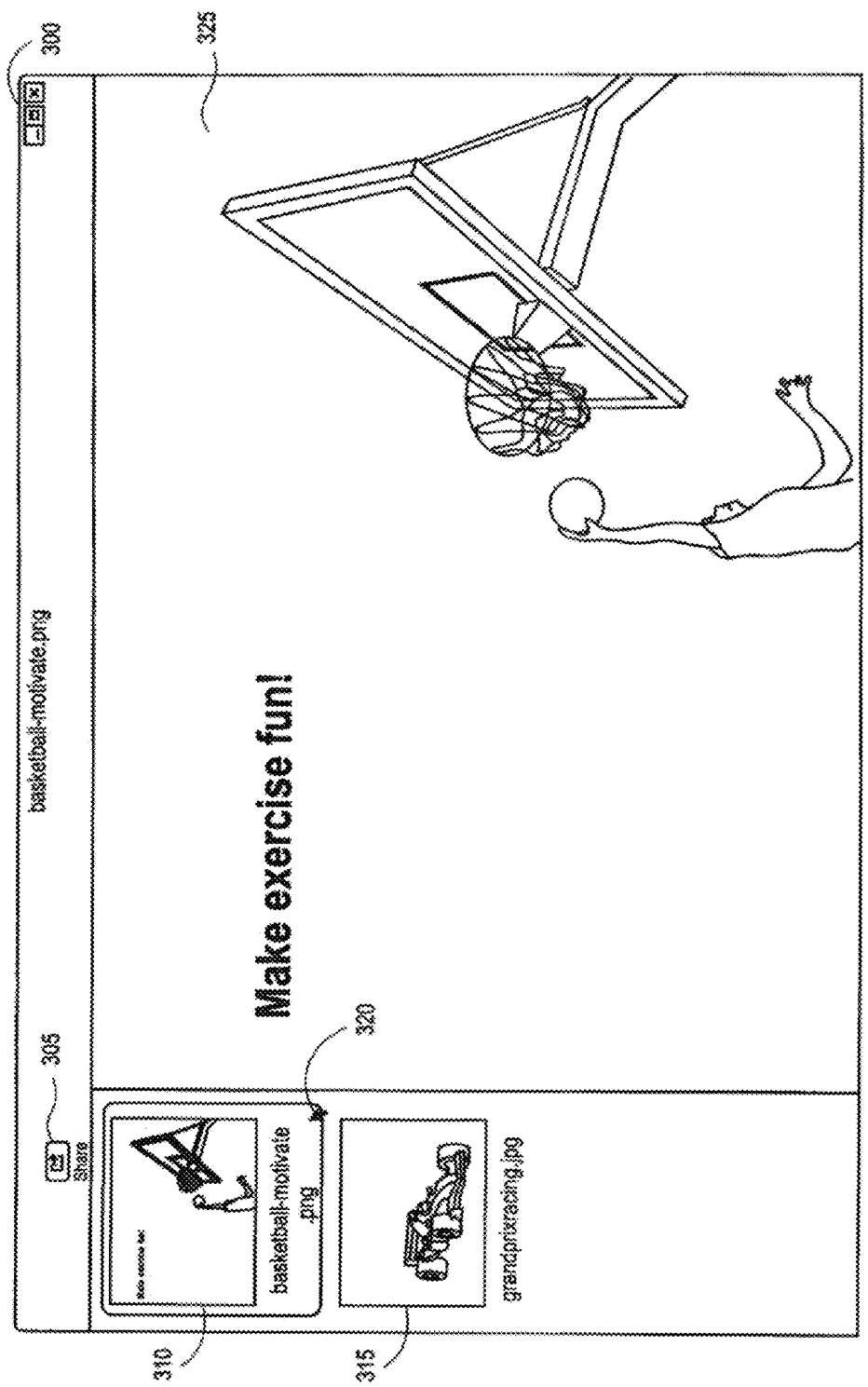
FIG. 3 illustrates an exemplary graphical user interface of a content aware sharing module, according to one embodiment.

FIG. 3 illustrates an exemplary graphical user interface of a content aware sharing module, according to one embodiment. Image viewer 300 displays two thumbnail images 310 and 315 that represent image content (in this case, files) "basketball-motivate.png" and "grandprixracing.jpg." In other embodiments, icons, filenames, or other file representation represents images 310 and 315. Thumbnail image 310 is "selected" as evidenced by a highlight box surrounding the thumbnail and further indicated by the mouse cursor 320 positioned over the image content 310. In one embodiment, when the graphical user interface is a touch screen, a mouse cursor 320 is not visible. An enlarged view of the thumbnail image 310 is displayed in a main window 325. In one embodiment, image viewer 300 allows the selection of two or more images simultaneously. In one embodiment, images, text, movies, audio, and other content types can be selected together for sharing. For example, when an image is selected in addition to the selection of text, the text is also automatically and simultaneously shared with a content sharing service. Share button 305 triggers sharing of selected thumbnail 310 in image viewer 300. In other embodiments, sharing button 305 is embedded into other applications other than image viewer 300 (e.g., text editor, movie editor, music player, word processor, file browser, or any other application). In other embodiments, share button is represented by a different icon and/or without accompanying "share" text.

Figure 4:
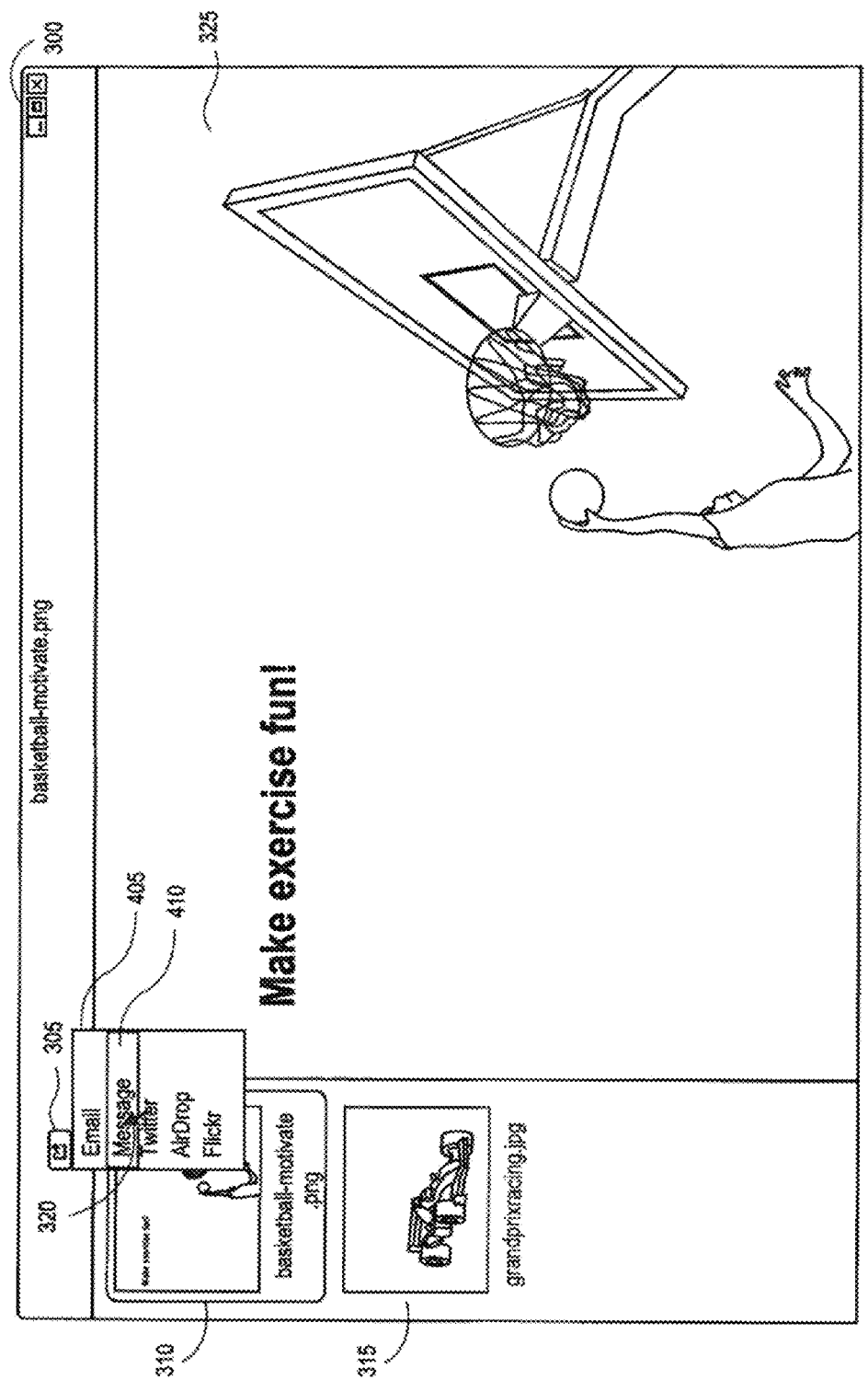
FIG. 4 illustrates the exemplary graphical user interface of FIG. 3 while selecting a content share button.

FIG. 4 illustrates the exemplary graphical user interface of FIG. 3 while selecting a share button 305 and highlighting (selecting) content sharing item "Message" 410. In one embodiment, clicking, touching, or otherwise triggering the share button 305 displays or calls menu 405. Menu 405 displays compatible content sharing services "Email, iMessage®, Twitter®, AirDrop®, and Flickr®." In one embodiment, the content aware sharing module determines compatible content sharing services. In one embodiment, triggering the share button 305 causes the content aware sharing module to determine the content type of the selected content (in this example, image content 310) and match the content type to compatible content sharing services. In one embodiment, only matching content sharing services are displayed in menu 405. In other embodiments, content sharing services that are not compatible with the selected content are greyed out and/or represented in the menu 405 so that they are not selectable. In one embodiment, the share button is also greyed out or unresponsive if no content is selected, or if no compatible content type is selected. For example, selecting an audio content type when no content sharing services are setup or available to share audio content types can result in an unresponsive or unavailable content share button 305. In one embodiment, the share button 305 is only visible in a menu bar or elsewhere in an application (e.g., through a menu item) if no content is selected, or if no compatible content type is selected.

Figure 5:
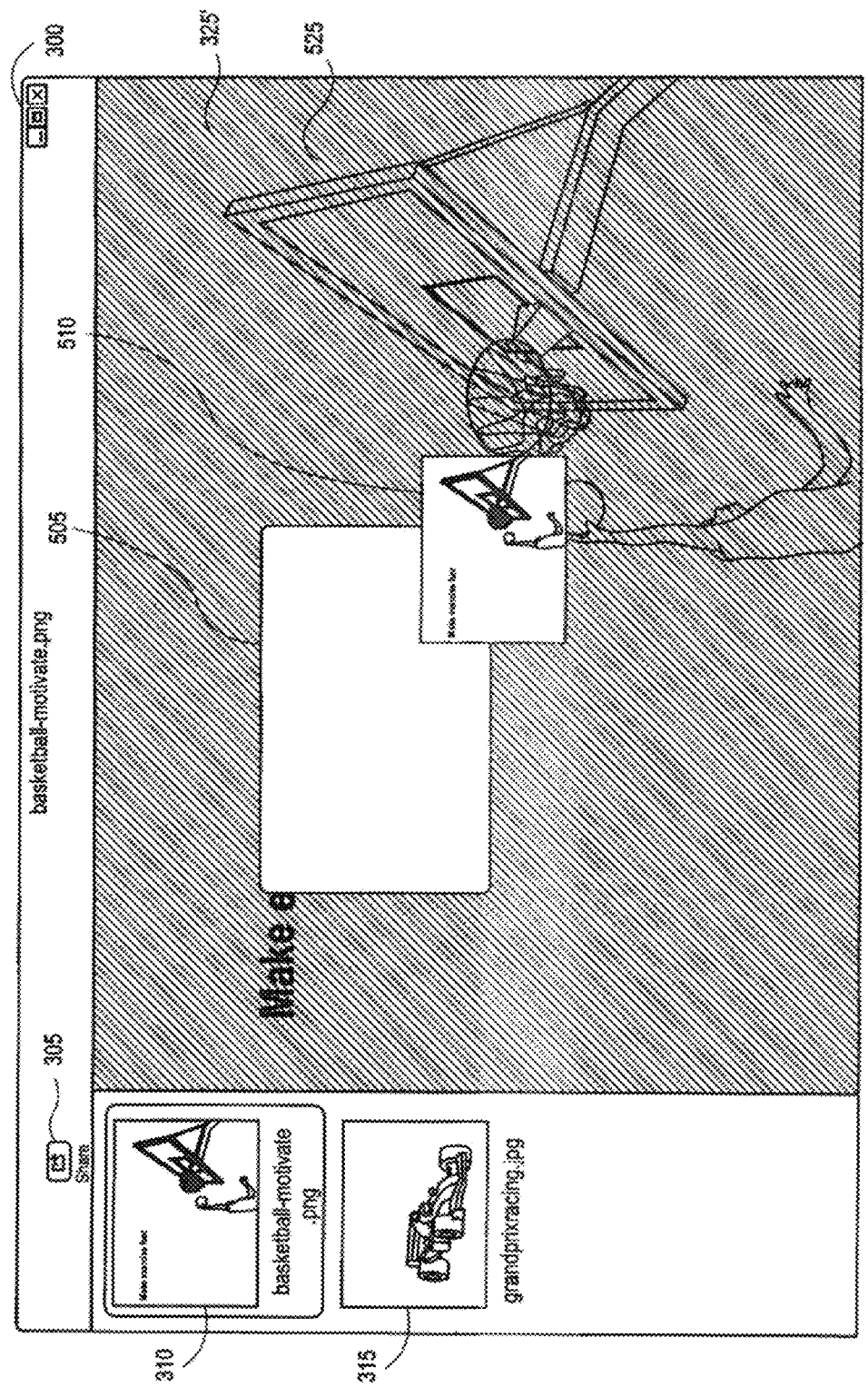
FIG. 5 illustrates the exemplary graphical user interface of FIG. 4 after selecting a content sharing service.

FIG. 5 illustrates the exemplary graphical user interface of FIG. 4 after selecting content sharing service "Message" 410. In one embodiment, a pop up window 505 appears on the display. In one embodiment, the pop up window 505 gradually increases in size while a representation 510 of the selected content 310 moves from an outer edge of the display area towards the pop up window 505. In one embodiment, main window 325' showing content 310 is shaded or greyed out with an overlay 525. In one embodiment, a semi-transparent dark overlay 525 covers the area between the main window 325' and the pop up window 505 and the representation 510 of the selected content 310. In one embodiment, the area surrounding pop up window 505 is darkened, or otherwise changed to provide greater emphasis on the pop up window 505 and the representation 510 of the selected content 310. In one embodiment, instead of overlay 525, the main content window 325' is reduced in brightness and/or contrast compared to the other components of the image viewer 300. In one embodiment, pop up window 505 is a standard operating system dialog box or information window for presenting information to a user.

Figure 6:
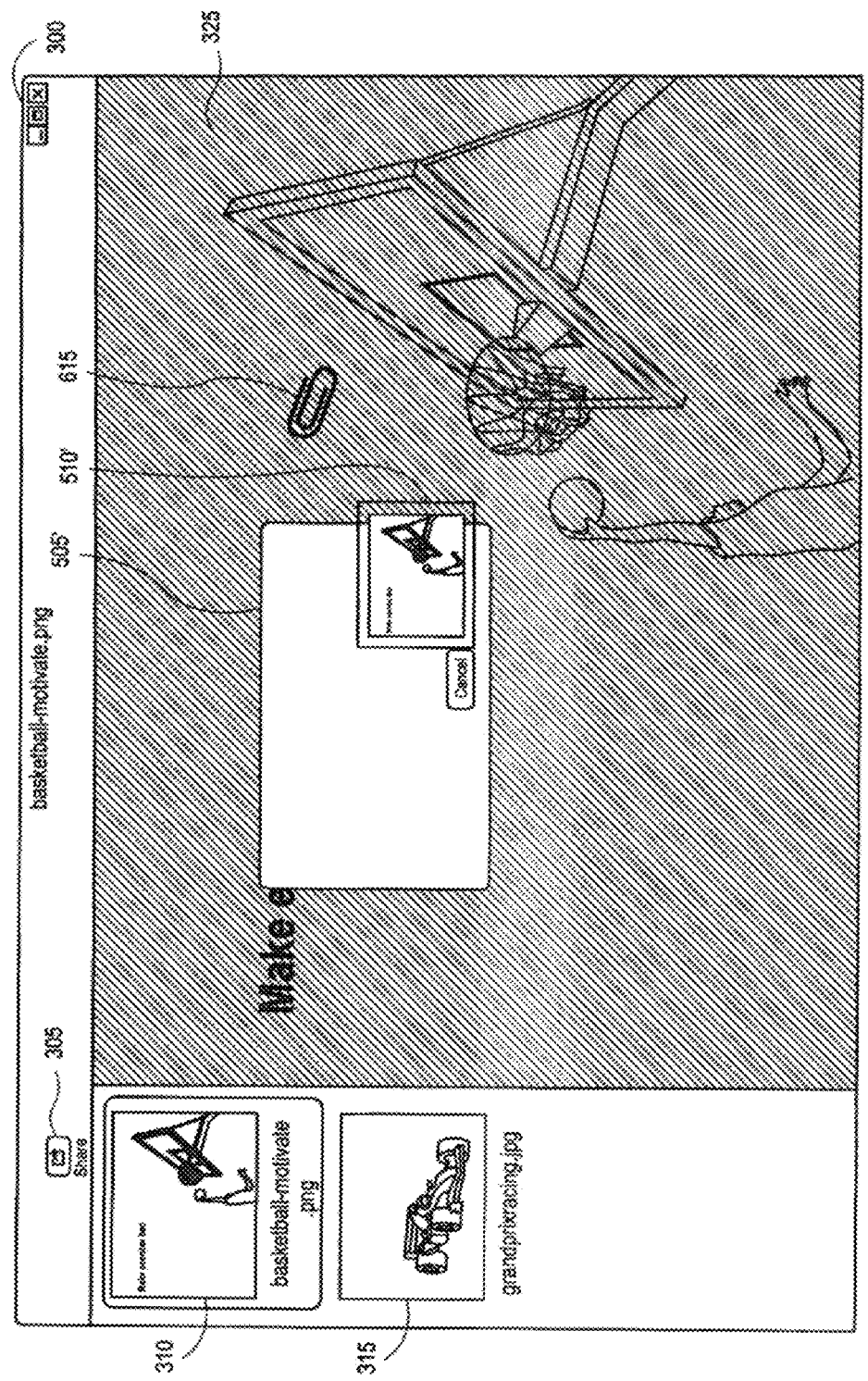
FIG. 6 illustrates the exemplary graphical user interface of FIG. 5 while content is added to a content sharing service window.

FIG. 6 illustrates the exemplary graphical user interface of FIG. 5 while content is added to a content sharing service window. In one embodiment, the pop up window 505' continues to increase in size from the previous representation in FIG. 5 and the representation 510 of the selected content 310 decreases in size and continues to move closer towards the pop up window 505. In one embodiment, a representation of a paperclip 615 moves from an edge of the window 300 towards the pop up window 505. In other embodiments, the paperclip 615 is a representation of a different type of mechanism or attachment device for holding paper or files together, such as a binder clip, magnet, pin, tack or fastener.

Figure 7:
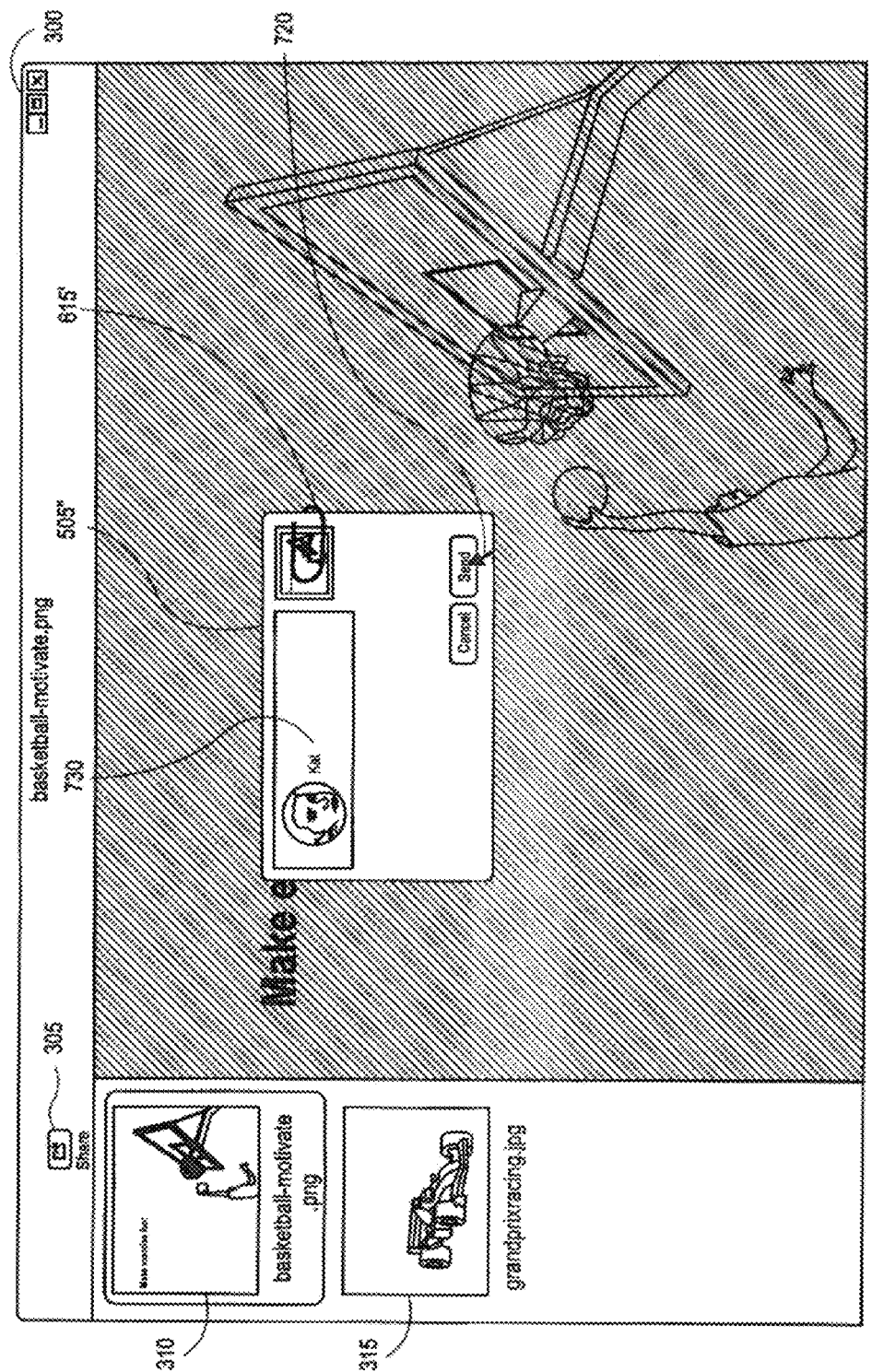
FIG. 7 illustrates the exemplary graphical user interface of FIG. 6 after content is attached to a content sharing service window.

FIG. 7 illustrates the exemplary graphical user interface of FIG. 6 after content is attached to a content sharing service window. In one embodiment, the representation of the paperclip 615 meets the representation of the selected content 510 at a point above a pop up window 505. In one embodiment, the representation of the paperclip 615 is part of an animation sequence showing selected content 510 being clipped to a pop up window 505. In one embodiment, the representation 510 of the selected content 310 positions itself over pop up window 505. In one embodiment, the representation of the selected content appears "attached" to the pop up window 505 by the representation of a paperclip 615'. FIG. 7 shows contact "Kat" 730 as the selected destination for selected content 310. A click/select send button 720 triggers the sharing of the selected content 315 by way of content service "iMessage®." In one embodiment, triggering the send button 720 causes the content sharing service window to shrink in size and ultimately disappear completely. In other embodiments, triggering a send or share button causes the pop up window 505 to move from the center of the display towards an outside edge of the display, continuing moving towards the edge until the window is completely outside of the edge of the display and no is longer visible.

Figure 8:
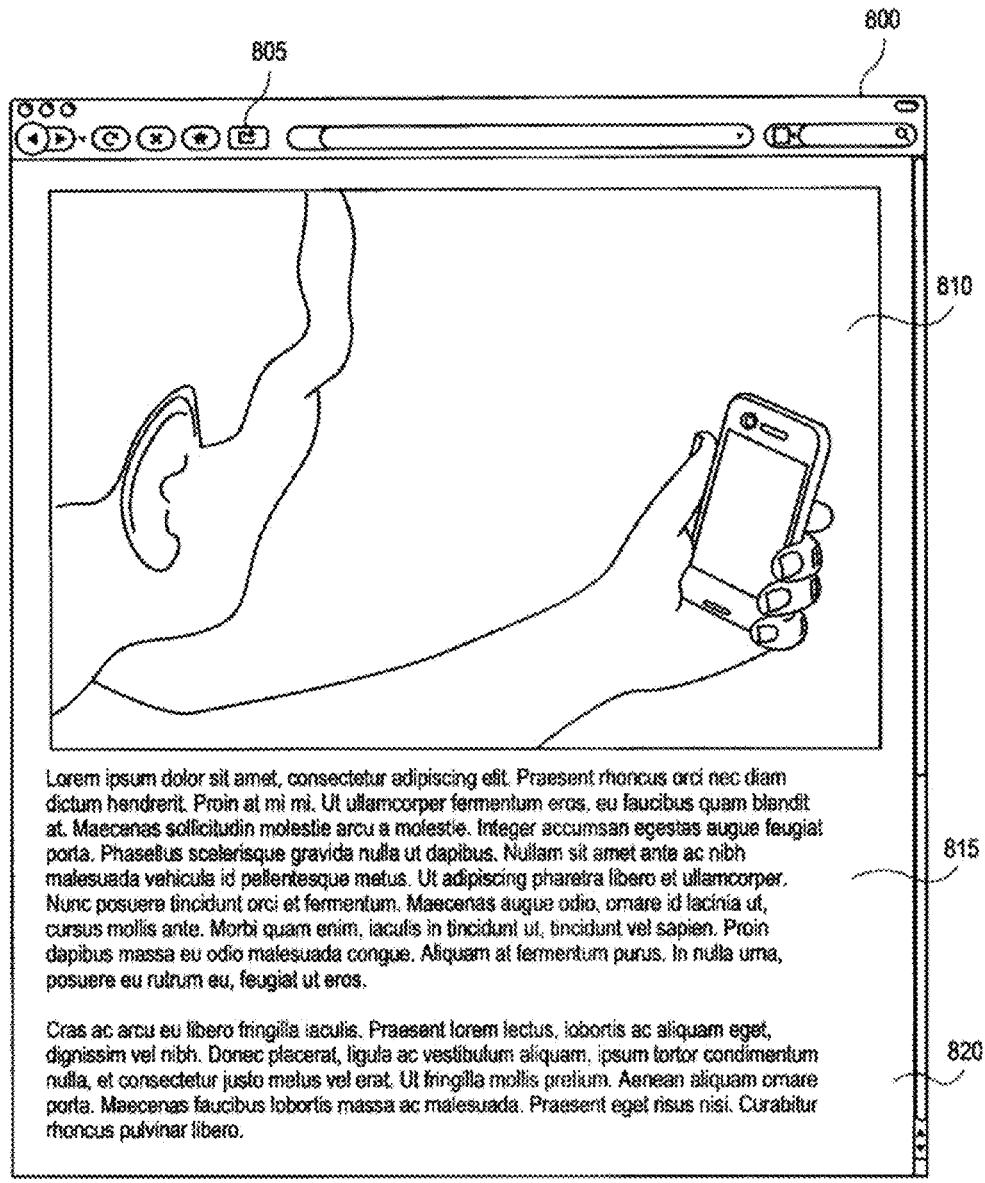
FIG. 8 illustrates an exemplary graphical user interface of content aware sharing in a web browser, according to one embodiment.

FIG. 8 illustrates an exemplary graphical user interface of content aware sharing in a web browser, according to one embodiment. In one embodiment, web browser 800 contains an integrated share button 805. FIG. 8 illustrates web browser 800 viewing a website containing a movie 810 and associated text paragraphs 815 and 820.

Figure 9:
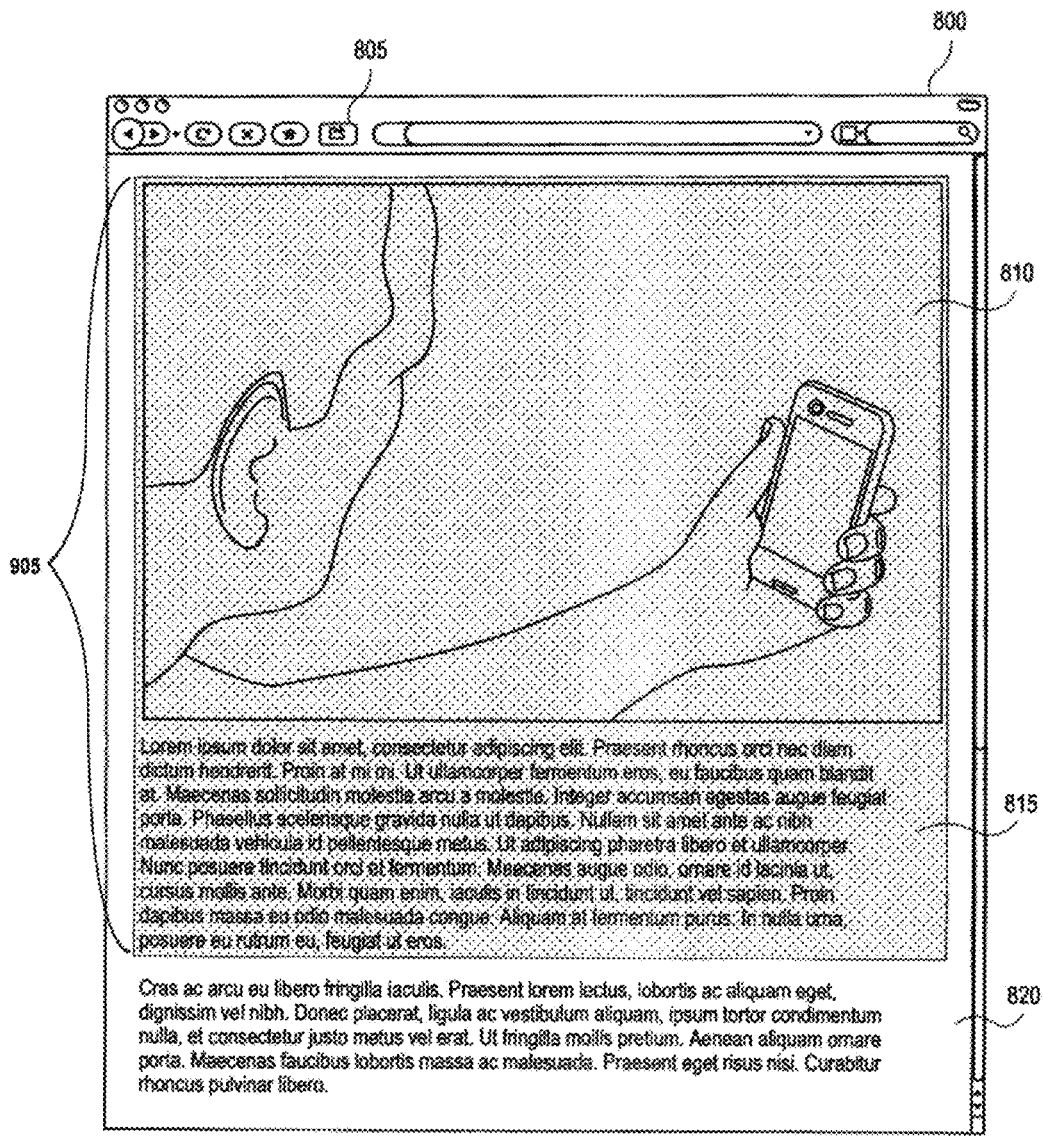
FIG. 9 illustrates the exemplary graphical user interface of FIG. 8 while text and image content types are selected in a web browser, according to one embodiment.

FIG. 9 illustrates the exemplary graphical user interface of the web browser in FIG. 8 while text and movie content types are selected, according to one embodiment. Selected content 905 includes text paragraph 815 and movie 810. The selection of the text paragraph 815 and movie 810 can be accomplished by methods known in the art (e.g., dragging a selection window, or touching the screen and dragging a finger). In one embodiment, sharing the selected content 905 (e.g., clicking, or touching the share button 805), displays sharing options that are compatible with both text and movie content types. For example, email and messaging are compatible with both text and movie content types.

In one embodiment, content sharing services that are not compatible with all of the selected content types are not displayed. For example, image only content sharing services can be hidden when an incompatible type of content is selected. An image only sharing service, such as Flickr®, may be incompatible with movie types, therefore Flickr® may not be displayed as a content sharing option if a movie content type is selected for sharing. In another embodiment, partially compatible content sharing options are displayed with partial shading or other different presentation, such that a user can be alerted that the content sharing service is not fully compatible with the selected content.

In one embodiment, when one of a plurality of content types is compatible with a content sharing service, the content sharing service is displayed but incompatible content ignored if the service is selected. For example, selecting image and movie content types displays Flickr® as a content sharing service option even though Flickr® is unable to share movies. When Flickr® is selected to share content comprising images and movies, the movie content is ignored. In one embodiment, a message to the user is displayed to report that one of the content types was incompatible and ignored. In one embodiment, an alternative content sharing service is proposed.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, disclosed embodiments may be implemented in, but not limited to, hardware or firmware utilizing an FPGA, ASIC, a processor, a computer, or a computer system including a network. Modules and components of hardware or software implementations can be divided or combined without significantly altering the disclosed embodiments. The specification and drawings are, accordingly, to be regarded in an illustrative sense rather than a restrictive sense.

What is claimed is:

1. A machine readable non-transitory storage medium containing executable instructions which when executed by a data processing system cause the data processing system to perform a method comprising:
  receiving a selection of content, wherein the content is selected within a graphical user interface (GUI) of an application and the application executes on an operating system maintaining a geographic region setting based on preferences within the operating system;
  determining the selected content is a first content type;
  matching the first content type with a first transfer mode compatible with the first content type, wherein the first transfer mode is associated with the geographic region setting of the operating system;
  after matching the first content type with the first transfer mode, presenting, within the GUI of the application, the first transfer mode in a manner that a user can select the first transfer mode, wherein a second transfer mode compatible with the first content type is associated with a geographic region different from the geographic region setting of the operating system and the second transfer mode is hidden or distinguished from the first transfer mode within the GUI of the application;

receiving, within the GUI of the application, a first transfer mode selection; and transferring, by the selected first transfer mode, the selected content to a destination.

2. The medium of claim 1, wherein the first content type is one of an image type, video type, audio type, or text type.

3. The medium of claim 1, wherein the first transfer mode is one or more of an image sharing service, social networking service, data storage service, email, and text message.

4. The medium of claim 1, wherein the content is selected and transferred to the destination without the user exiting or switching from the application and without a user initiated account entry.

5. The medium of claim 1 further comprising:

determining the selected content comprises the first content type and a second content type different from the first content type;

matching the first content type and the second content type with a second transfer mode compatible with the first content type and the second content type; and sending, automatically by the second transfer mode, the selected content comprising the first content type and the second content type, to the destination.

6. The medium of claim 1, further comprising:

determining a plurality of transfer modes are selected and automatically transferring, by the plurality of transfer modes, the selected content.

7. The medium of claim 1, wherein an application setting causes the first transfer mode compatible with the first content type to be replaced with a second transfer mode compatible with the first content type within the GUI.

8. The medium of claim 1 further comprising:

displaying, after determining the first transfer mode was selected, a transfer mode display window;

moving a representation of the selected content into a position overlapping a portion of the display of the transfer mode display window;

moving a representation of an attachment device into a position overlapping a portion of the representation of the selected content; and displaying a representation of the selected content attached by the attachment device to the transfer mode display window.

9. The medium of claim 1, wherein determining the selected content is a first content type includes determining a codec of the selected content and wherein matching the first content type with a first transfer mode includes determining whether the first transfer mode is compatible with the codec associated with the selected content.

10. A machine-implemented method comprising:

receiving a selection of content, wherein the content is selected within a graphical user interface (GUI) of an application and the application executes on an operating system maintaining a geographic region setting based on preferences within the operating system;

determining the selected content is a first content type;

matching the first content type with a first transfer mode compatible with the first content type, wherein the first transfer mode is associated with the geographic region setting of the operating system;

presenting, within the GUI of the application, the first transfer mode in a manner that a user can select the first transfer mode, wherein a second transfer mode compatible with the first content type is associated with a geographic region different from the geographic region setting of the operating system and the second transfer mode is hidden or distinguished from the first transfer mode within the GUI of the application;

receiving, within the GUI of the application, a first transfer mode selection; and transferring, by the selected first transfer mode, the selected content to a destination.

11. The machine-implemented method of claim 10, wherein the first content type is one of an image type, video type, audio type, or text type.

12. The machine-implemented method of claim 10, wherein the first transfer mode is one or more of an image sharing service, social networking service, data storage service, email, and text message.

13. The machine-implemented method of claim 10, wherein content is selected and transferred to the destination without the user exiting or switching from the application and without a user initiated account entry.

14. The machine-implemented method of claim 10 further comprising:

determining the selected content comprises the first content type and a second content type different from the first content type;

matching the first content type and the second content type with a second transfer mode compatible with the first content type and the second content type; and sending, automatically by the second transfer mode, the selected content comprising the first content type and the second content type, to the destination.

15. The machine-implemented method of claim 10, further comprising:

determining a plurality of transfer modes are selected and automatically transferring, by the plurality of transfer modes, the selected content.

16. The machine-implemented method of claim 10 further comprising:

displaying, after determining the first transfer mode was selected, a transfer mode display window;

moving a representation of the selected content into a position overlapping a portion of the display of the transfer mode display window;

moving a representation of an attachment device into a position overlapping a portion of the representation of the selected content; and displaying a representation of the selected content attached by the attachment device to the transfer mode display window.

17. The machine-implemented method of claim 10, determining the selected content is a first content type includes determining a codec of the selected content and wherein matching the first content type with a first transfer mode includes determining whether the first transfer mode is compatible with the codec associated with the selected content.

18. A data processing system comprising a non-transitory machine readable medium storing instructions;

a processing system to execute the instructions, the instructions to cause the processing system to provide an operating system including a content aware sharing module to provide content aware sharing to one or more applications executing on the operating system, the operating system additionally configured to maintain a geographic region setting based on preferences within the operating system, and wherein the operating system is further to manage execution of an application displayed via a graphical user interface (GUI) of the data processing system;

wherein the application is to receive a selection of content within the GUI of the application;

wherein the content aware sharing module of the operating system is to determine the selected content is a first content type, match the first content type with a first transfer mode compatible with the first content type, determine whether the first transfer mode is compatible with a codec associated with the selected content, present the first transfer mode in a manner that a user can select the first transfer mode, receive, from the application, a first transfer mode selection, and transfer, via the selected first transfer mode, the selected content to a destination, wherein the first transfer mode is associated with the geographic region setting of the operating system; and wherein a second transfer mode compatible with the first content type is associated with a geographic region different from the geographic region setting of the operating system and the second transfer mode is hidden or distinguished from the first transfer mode within the GUI of the application.

* * * * *